US009294751B2

(12) United States Patent
Krisman (10) Patent No.: US 9,294,751 B2
(45) Date of Patent: Mar. 22, 2016

(54) METHOD AND SYSTEM FOR DISPARITY ADJUSTMENT DURING STEREOSCOPIC ZOOM (75) Inventor: John Alan Krisman, East Aurora, NY (US)

(73) Assignee: Mattel, Inc., El Segundo, CA (US)

( * ) Notice: Subject to any disclaimer, the term of this patent is extended or adjusted under 35 U.S.C. 154(b) by 256 days.

(21) Appl. No.: 13/995,213

(22) PCT Filed: Dec. 22, 2011

(86) PCT No.: PCT/US2011/066841
§ 371 (c)(1),
(2), (4) Date: Jul. 2, 2014

(87) PCT Pub. No.: WO2012/088415
PCT Pub. Date: Jun. 28, 2012

(65) Prior Publication Data
US 2015/0163475 A1 Jun. 11, 2015

Related U.S. Application Data (60) Provisional application No. 61/426,764, filed on Dec. 23, 2010.

(51) Int. Cl.
H04N 13/00 (2006.01)
H04N 13/04 (2006.01)

(52) U.S. Cl.
CPC ................................ H04N 13/0022 (2013.01)

(58) Field of Classification Search
None
See application file for complete search history.

(56) References Cited

U.S. PATENT DOCUMENTS 4,925,294 A 5/1990 Geshwind et al.
5,257,345 A 10/1993 Malm
5,491,646 A 2/1996 Erskine
5,500,765 A 3/1996 Eichenlaub
(Continued)

FOREIGN PATENT DOCUMENTS

CN 1956554 A 5/2007
JP 2003-241138 A 8/2003
(Continued)

OTHER PUBLICATIONS

Int'l Preliminary Report on Patentability issued Jul. 4, 2013 in Int'l Application No. PCT/US2011/066841.
(Continued)

Primary Examiner — Jorge L Ortiz Criado
Assistant Examiner — Samuel D Fereja
(74) Attorney, Agent, or Firm — Edell, Shapiro & Finnan, LLC (57) ABSTRACT A method for zooming a stereoscopic image appearing on an electronic display of a stereoscopic image displaying device. The stereoscopic image has horizontal disparity and is generated by an electronic processor from stereoscopic image data stored in a memory as a left-eye image pixel map and a right-eye image pixel map. The horizontal disparity of the stereoscopic image data is adjusted to produce disparity-adjusted, scaled stereoscopic image data based on a heuristic defining a relationship between a user zoom request, a predetermined stereoscopic factor and a relative horizontal shift between the left-eye image pixel map and the right-eye image pixel map. A zoomed stereoscopic image corresponding to the disparity-adjusted, scaled stereoscopic image data is displayed.

8 Claims, 5 Drawing Sheets

(56) References Cited

U.S. PATENT DOCUMENTS

| | | | |
|---|---|---|---|
| 5,543,964 A | 8/1996 | Taylor et al. | |
| 5,661,518 A | 8/1997 | Palm et al. | |
| 5,748,199 A | 5/1998 | Palm | |
| 5,795,154 A | 8/1998 | Woods | |
| 5,961,333 A | 10/1999 | Harrison et al. | |
| 5,977,979 A | 11/1999 | Clough et al. | |
| 6,023,277 A | 2/2000 | Osaka et al. | |
| 6,039,574 A | 3/2000 | Standiford et al. | |
| 6,208,348 B1 | 3/2001 | Kaye | |
| 6,285,779 B1 | 9/2001 | Lapidous et al. | |
| 6,313,866 B1 | 11/2001 | Akamatsu et al. | |
| 6,353,457 B2 | 3/2002 | Uomori et al. | |
| 6,389,236 B1 | 5/2002 | Western | |
| 6,438,260 B1 | 8/2002 | Robinson | |
| 6,478,583 B1 | 11/2002 | Standiford et al. | |
| 6,489,962 B1 | 12/2002 | Ambroziak et al. | |
| 6,494,786 B2 | 12/2002 | Oshita | |
| 6,590,573 B1 | 7/2003 | Geshwind | |
| 6,687,003 B1 | 2/2004 | Sorensen et al. | |
| 6,798,406 B1 * | 9/2004 | Jones et al. | 345/419 |
| 6,961,177 B2 | 11/2005 | Sato et al. | |
| 7,046,440 B1 | 5/2006 | Kaehr | |
| 7,083,420 B2 | 8/2006 | Wood et al. | |
| RE39,342 E | 10/2006 | Starks et al. | |
| 7,249,950 B2 | 7/2007 | Freeman et al. | |
| 7,403,201 B2 | 7/2008 | Takemoto et al. | |
| 7,512,262 B2 | 3/2009 | Criminisi et al. | |
| 7,525,704 B2 | 4/2009 | Loce et al. | |
| 7,529,519 B2 | 5/2009 | Wood et al. | |
| 7,551,770 B2 | 6/2009 | Harman | |
| 7,557,824 B2 | 7/2009 | Holliman | |
| 7,639,838 B2 | 12/2009 | Nims | |
| 7,728,868 B2 | 6/2010 | Razzaque et al. | |
| 8,004,622 B2 | 8/2011 | Schultz et al. | |
| 2001/0045979 A1 | 11/2001 | Matsumoto et al. | |
| 2002/0009701 A1 | 1/2002 | Greenberg | |
| 2002/0105514 A1 | 8/2002 | Roche | |
| 2002/0118275 A1 | 8/2002 | Harman | |
| 2002/0191841 A1 | 12/2002 | Harman | |
| 2003/0077558 A1 | 4/2003 | Wood et al. | |
| 2003/0086601 A1 | 5/2003 | Lee et al. | |
| 2003/0218637 A1 | 11/2003 | Sloo et al. | |
| 2004/0012670 A1 | 1/2004 | Zhang | |
| 2004/0120039 A1 | 6/2004 | Sato et al. | |
| 2004/0135780 A1 | 7/2004 | Nims | |
| 2004/0157204 A1 | 8/2004 | Griffin | |
| 2004/0214146 A1 | 10/2004 | Harris et al. | |
| 2005/0281411 A1 | 12/2005 | Vesely et al. | |
| 2006/0094512 A1 | 5/2006 | Yoshino et al. | |
| 2006/0147888 A1 | 7/2006 | Burghardt et al. | |
| 2006/0193509 A1 | 8/2006 | Criminisi et al. | |
| 2006/0203085 A1 * | 9/2006 | Tomita | 348/51 |
| 2006/0268008 A1 | 11/2006 | Idesawa et al. | |
| 2007/0015400 A1 | 1/2007 | Rudell et al. | |
| 2007/0052794 A1 | 3/2007 | Ha et al. | |
| 2007/0077541 A1 | 4/2007 | Champagne et al. | |
| 2007/0159476 A1 | 7/2007 | Grasnick | |
| 2007/0166688 A1 | 7/2007 | Leonard et al. | |
| 2007/0188711 A1 | 8/2007 | Sharp et al. | |
| 2007/0195082 A1 | 8/2007 | Takanashi et al. | |
| 2007/0218433 A1 | 9/2007 | Vanova | |
| 2007/0257902 A1 * | 11/2007 | Satoh et al. | 345/419 |
| 2007/0271528 A1 | 11/2007 | Park et al. | |
| 2007/0296809 A1 | 12/2007 | Newbery | |
| 2008/0193903 A1 | 8/2008 | Suh | |
| 2008/0311548 A1 | 12/2008 | Jiang | |
| 2009/0085912 A1 | 4/2009 | Scott | |
| 2009/0091667 A1 | 4/2009 | Schultz et al. | |
| 2009/0116732 A1 | 5/2009 | Zhou et al. | |
| 2009/0183100 A1 | 7/2009 | Eom et al. | |
| 2009/0190095 A1 | 7/2009 | Ellinger et al. | |
| 2009/0219383 A1 | 9/2009 | Passmore | |
| 2009/0322860 A1 | 12/2009 | Zhang et al. | |
| 2010/0103249 A1 * | 4/2010 | Lipton et al. | 348/51 |
| 2010/0110164 A1 | 5/2010 | Kubara | |
| 2010/0171697 A1 * | 7/2010 | Son et al. | 345/158 |
| 2010/0225743 A1 | 9/2010 | Florencio et al. | 348/46 |
| 2011/0018969 A1 * | 1/2011 | Tanaka | 348/47 |
| 2011/0102559 A1 * | 5/2011 | Nakane | 348/54 |
| 2011/0175910 A1 * | 7/2011 | Yahagi | 345/419 |
| 2012/0098938 A1 * | 4/2012 | Jin | 348/47 |
| 2012/0320163 A1 | 12/2012 | Yahagi | |

FOREIGN PATENT DOCUMENTS

| | | | |
|---|---|---|---|
| KR | 10-2008-0046518 A | 5/2008 | |
| KR | 10-2008-0088090 A | 10/2008 | |
| KR | 10-2009-0077597 A | 7/2009 | |
| WO | 2006013008 A1 | 2/2006 | |
| WO | 2008001967 A1 | 1/2008 | |
| WO | 2010035413 A1 | 4/2010 | |

OTHER PUBLICATIONS

Office Action issued Dec. 3, 2014 in CN Application No. 201180062354.3 (with English translation).

Int'l Search Report issued Sep. 10, 2012 in Int'l Application No. PCT/US2011/066841.

Int'l Search Report issued Apr. 29, 2011 in Int'l Application No. PCT/US2010/048253.

Jones et al, "Controlling Perceived Depth in Stereoscopic Images," Proceedings of the Society of Photo-Optical Instrumentation, vol. 4297, No. 42, pp. 42-53 (May 20, 2003).

Dodgson, "Variation and extrema of human interpupillary distance," Proceedings of the Society of Photo-Optical Instrumentation, vol. 5291, pp. 36-46 (Jan. 19-22, 2004).

Holliman, "3D Display Systems," pp. 1-45 (Feb. 2, 2005).

* cited by examiner

Fig. 9B

METHOD AND SYSTEM FOR DISPARITY ADJUSTMENT DURING STEREOSCOPIC ZOOM

CROSS-REFERENCE TO RELATED APPLICATIONS

This application is a Section 371 of International Patent Application No. PCT/US2011/066841, filed Dec. 22, 2011, designating the United States and which was published in the English language on Jun. 28, 2012 under International Publication No. WO 2012/088415 A2, which International Patent Application, in turn, claims the benefit related to of U.S. Provisional Patent Application No. 61/426,764, filed Dec. 23, 2010, incorporated in the entirety herein by reference, and claims the earlier filing date of the provisional application. Each of the above-identified related applications is incorporated in the entirety herein by reference.

BACKGROUND OF THE INVENTION

The present invention relates to a method and system for zooming a stereoscopic image appearing on an electronic display. More particularly, the present invention relates to a method and system for adjusting the disparity of a stereoscopic image appearing on an electronic display when a user zoom request is received.

The perception of depth in the planar stereo image pairs of a stereoscopic image appearing on an electronic display differs from a human's stereoscopic perception of depth in the natural world. Human stereoscopic depth perception in the natural world occurs when the left and right eyes converge their visual axes to fixate on a point while simultaneously adjusting their accommodation state through muscular action changing the focal length of the lens of each eye so that points in space at and around the fixation point come into focus. The fixation point projects to identical positions on each retina and therefore has zero retinal disparity. Points in front of or behind the fixation point project to different positions on the left and right retina. The resulting binocular disparity between the corresponding point in the left and right retinal images provides the human brain the cues from which depth may be perceived.

A key physiological difference between the perception of depth in a stereoscopic image rather than a scene in the natural world is that although the left and right eye need to converge off the stereoscopic image plane to fixate points in depth their accommodation state must always keep the image plane itself in focus. This requires that the viewer be able to alter the normal link between convergence and accommodation and is one reason why images with large perceived depth may be uncomfortable to view.

Among other factors, the perceived depth in a stereoscopic image appearing on an electronic display is directly proportional to the viewing distance to a display. Accordingly, a viewer looking at the same stereoscopic image from different distances may perceive different depth. Further, the perceived depth is also directly proportional to screen disparity (the difference in the physical horizontal coordinates of corresponding points in the left-eye and right-eye images) and which varies for any given stereoscopic image if the image is displayed at different sizes. Still further, the perceived depth is inversely proportional to a viewers individual eye separation or interpupillary distance which varies from individual to individual.

Accordingly, there is a need in the art for a method and system for adjusting the disparity of a stereoscopic image appearing on an electronic display, in general, and, more particularly, when the stereoscopic image is being altered in response to a user zoom request.

BRIEF SUMMARY OF THE INVENTION

Briefly stated, one aspect of the invention is directed to a method for zooming a stereoscopic image appearing on an electronic display of a stereoscopic image displaying device in response to a user zoom request comprising a zoom magnitude. The stereoscopic image comprises a left-eye image and a right-eye image having relative horizontal disparity and being generated by an electronic processor from stereoscopic image data stored in a memory as a left-eye image pixel map comprising left-eye pixels and a right-eye image pixel map comprising right-eye pixels. The method comprises the steps of scaling the stereoscopic image data to produce scaled stereoscopic image data in response to the user zoom request; adjusting the horizontal disparity of the scaled stereoscopic image data to produce disparity-adjusted, scaled stereoscopic image data based on a heuristic defining a relationship between the user zoom request, a predetermined stereoscopic factor and a relative horizontal shift between the left-eye pixels in the left-eye image pixel map and the right-eye pixels in the right-eye image pixel map; and generating on the display a zoomed stereoscopic image corresponding to the disparity-adjusted, scaled stereoscopic image data.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to embodiments of the invention, examples of which are illustrated in the accompanying drawings. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the geometric center of the stereoscopic image displaying device, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first image could be termed a second image, and, similarly, a second image could be termed a first image, without departing from the scope of the present invention.

As used herein, the words "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The following description is directed towards various embodiments of a method and system for adjusting the disparity of a stereoscopic image appearing on an electronic display when a user zoom request is received.

Figure 1:
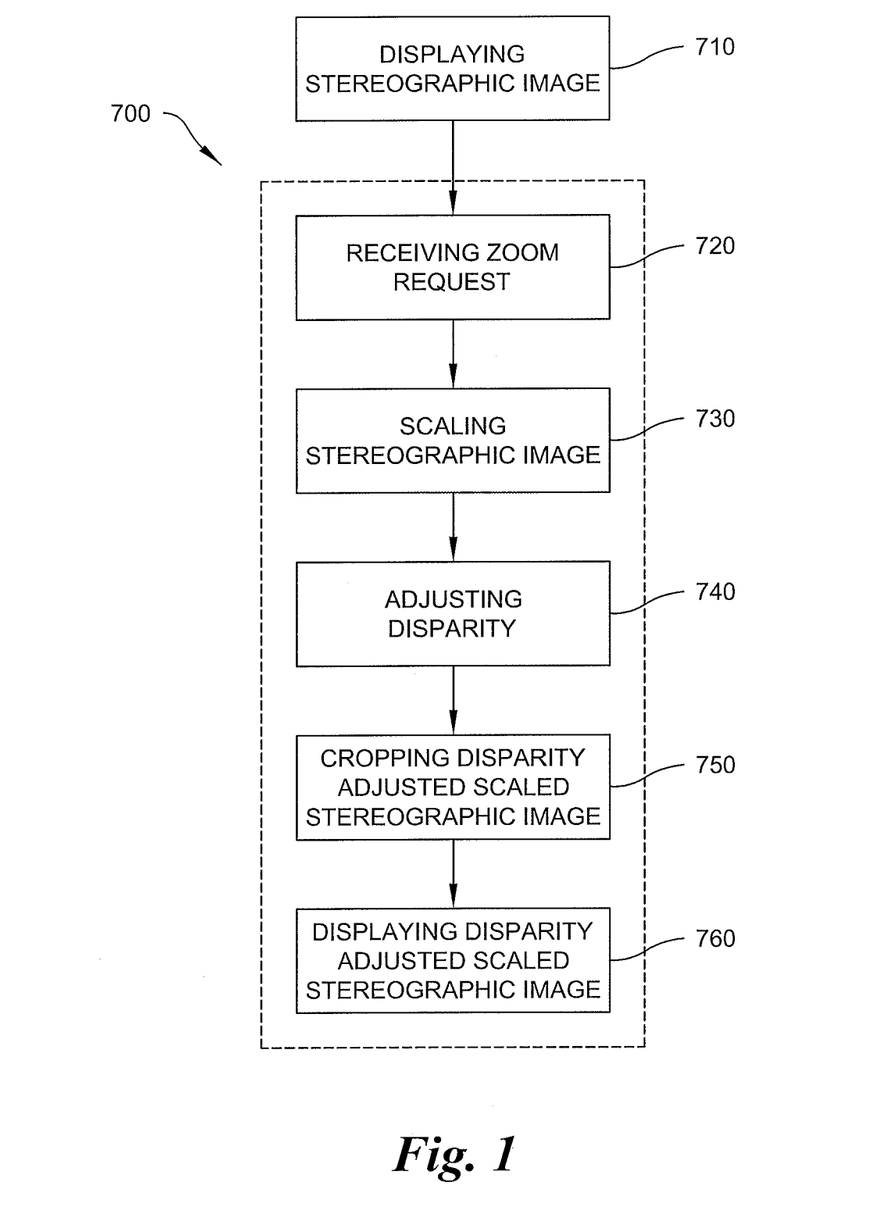
FIG. 1 is a functional flow diagram of a preferred embodiment of a method for zooming a stereoscopic image in accordance with the present invention.
Figure 2:
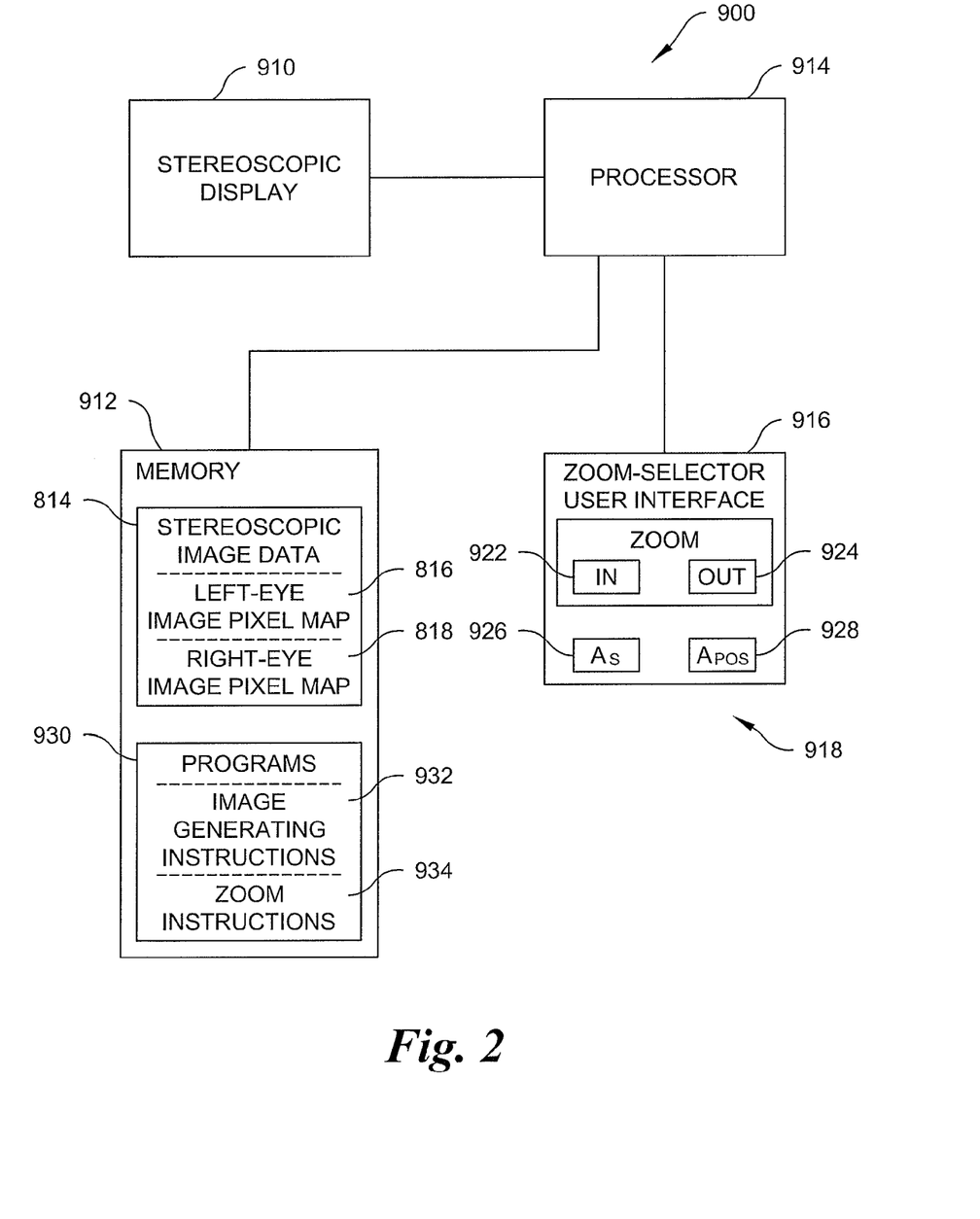
FIG. 2 is a schematic block diagram of a stereoscopic image generating device in accordance with the present invention.
Figure 3:
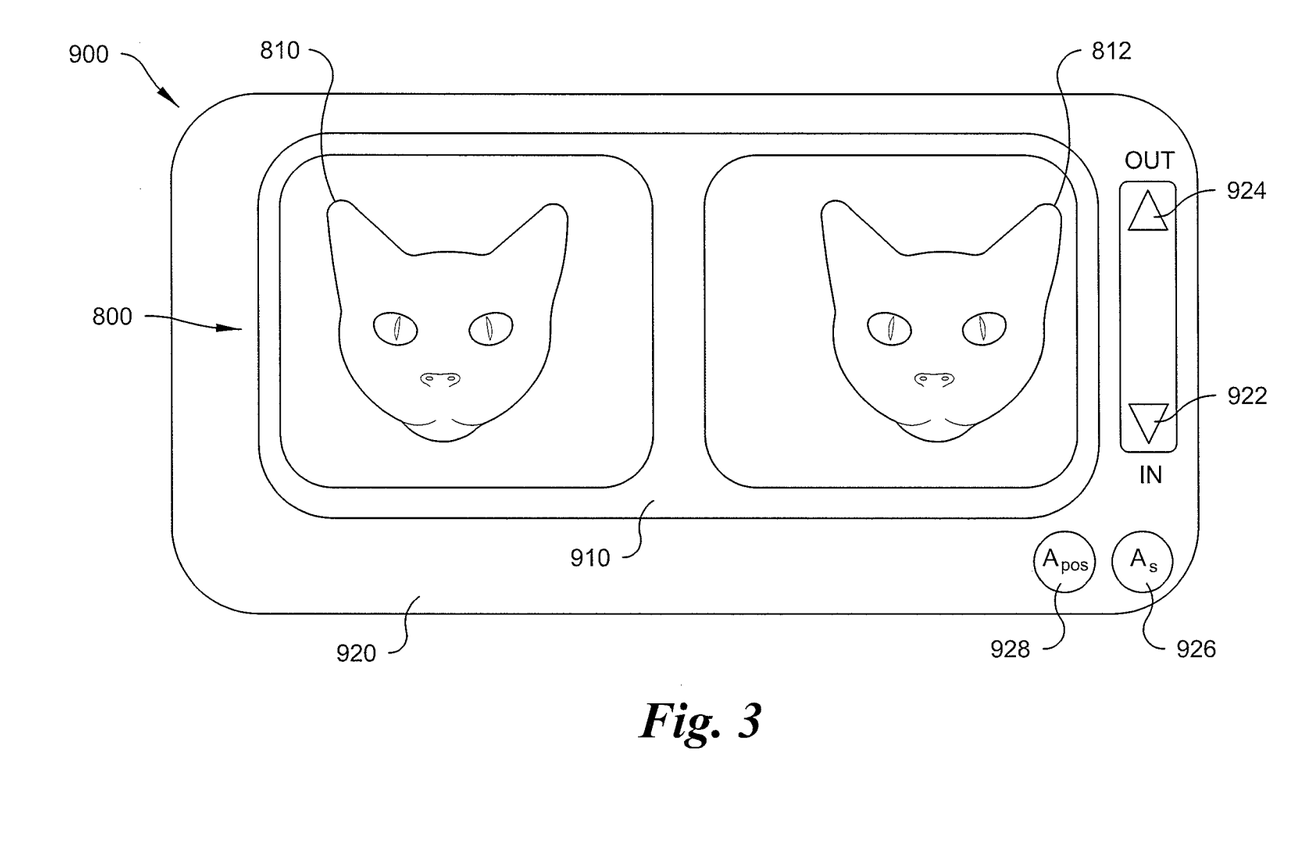
FIG. 3 is a plan view of a representative user interface for a stereoscopic image generating device in accordance with the present invention.

Referring to the drawings in detail, where like numerals indicate like elements throughout, there is shown in FIGS. 1-3 a preferred embodiment of a method, generally designated 700 and hereinafter referred to as the zooming method 700, and a stereoscopic image displaying device, generally designated 900 and herein after referred to as the stereoscopic device 900, for zooming a stereoscopic image 800 appearing on an electronic display 910 of the stereoscopic device 900 in response to receiving a user zoom request comprising a zoom magnitude in accordance with the present invention.

A user request to zoom in or out of an image or video may cause the stereoscopic device 900 to implement a heuristic in which the separation of (or retinal disparity created by) the stereoscopic image pair is adjusted in relation to the extent and direction of the zoom. Although example embodiments of a preferred zoom heuristic are illustrated below using anaglyphs, zoom heuristics are not limited to the method by which the stereoscopic scene is created. The artisan will understand that the heuristic is equally applicable to other well known methods for creating stereoscopic views, such as shuttering, polarization, or the use of lenticulars.

Figure 4A:
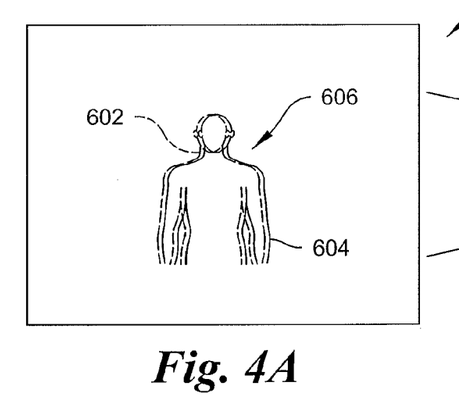
FIGS. 4A and 4B are a digital image of an anaglyph and a corresponding schematic diagram showing the depth of a figure in the field of view of a user viewing a scene having a positive parallax.
Figure 4B:
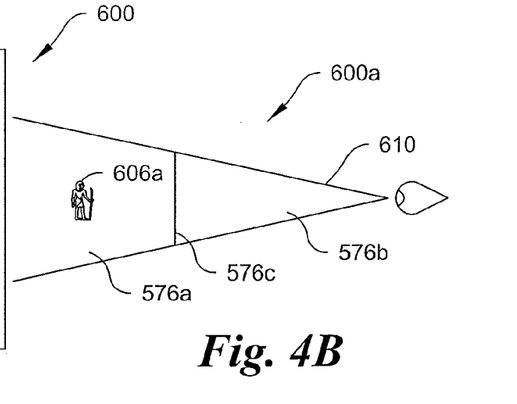

Referring to FIGS. 4A-6B, in one implementation, the zoom heuristic may decrease the amount of horizontal offset during a zoom-in to bring the image toward or into the foreground from an initially perceived depth. FIG. 4A schematically shows an initial stereoscopic scene 600 in which the anaglyph has a positive parallax. A cyan left-eye FIG. 602, the outline of which is shown by a dashed line, is to the left of a red right-eye FIG. 604, the outline of which is shown by a solid line. A viewer using red/cyan glasses to view the anaglyph would perceive the FIG. 606 to be behind the screen of the display. FIG. 4B is a schematic representation 600a of the stereoscopic scene 600 showing the depth of the FIG. 606 represented by the hieroglyphic FIG. 606a in the background 576a of the field of view 610 of the viewer. The surface of the display screen 576c is represented be a vertical line.

Figures 5A, 5B, 6A, 6B:
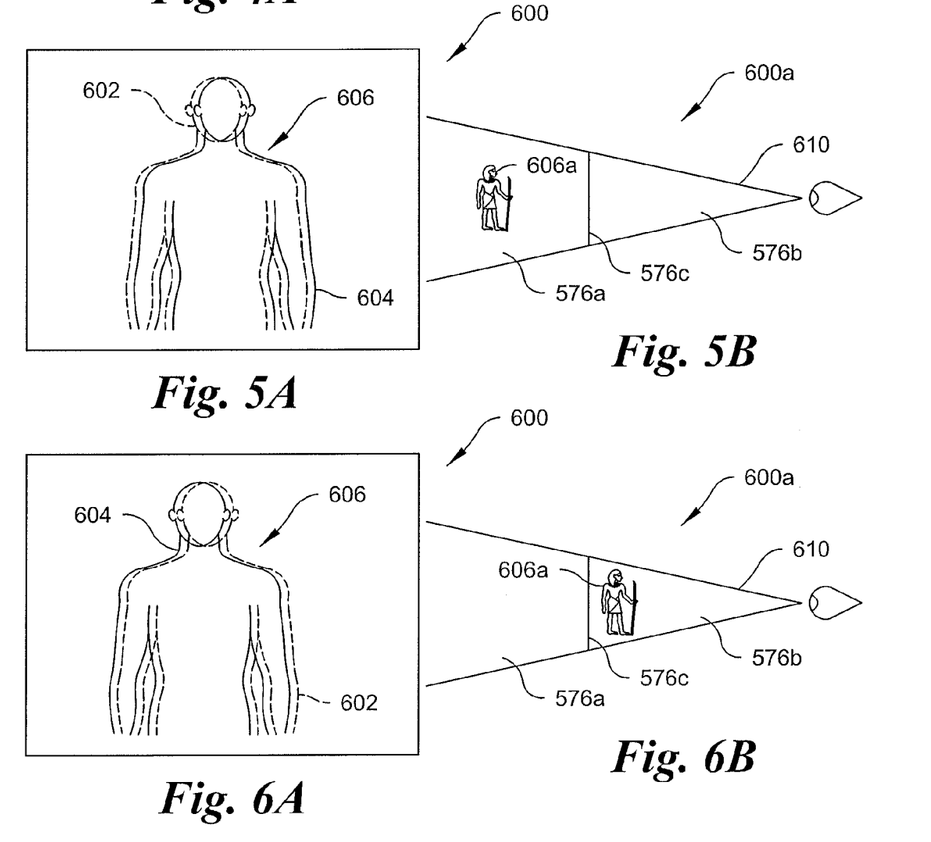
FIGS. 5A and 5B are a digital image of the anaglyph of FIG. 4A after zooming-in on the figure in the scene and a corresponding schematic diagram showing the depth of the figure in the field of view of a user after the zoom.
FIGS. 6A and 6B are a digital image of the anaglyph of FIG. 5A after a zoom heuristic has been applied to change the offset of the left-eye image relative to the right-eye image to create a scene with a negative parallax.

Zooming-in on the FIG. 606 without a parallax adjustment creates a scene in which the FIG. 606 appears enlarged without a change in perceived depth, as shown in FIG. 5A and the corresponding schematic shown in FIG. 5B.

Referring to FIG. 6A and the associated schematic FIG. 6B, to obtain a more dramatic effect of the zoom while maintaining the size of the FIG. 606 (hieroglyphic 606a) substantially the same as the size of the figure in FIGS. 5A-B (i.e., without zooming further), a zoom heuristic has been applied to the scene in FIG. 5A decreasing the offset between the left-eye image 602 and the right-eye image 604 by an amount sufficient to move the left-eye image to the right of the right-eye image producing a scene having a negative parallax. Consequently, a user viewing the scene in FIG. 6A with red/cyan glasses would perceive that the depth of the figure has moved to the foreground 576b of the field of view 610.

Figure 7A:
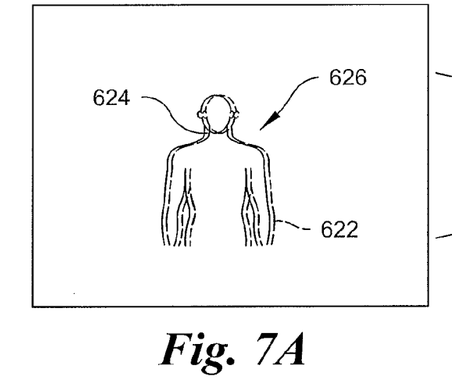
FIGS. 7A and 7B are a digital image of an anaglyph and a corresponding schematic diagram showing the depth of a figure in the field of view of a user viewing a scene having a negative parallax.
Figure 7B:
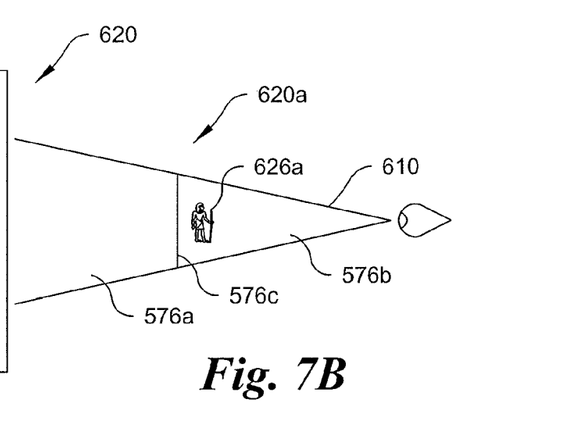

Referring to FIGS. 7A-9B, in another implementation, the zoom heuristic may increase the amount of horizontal offset during a zoom-in to bring the image toward or into the background to avoid breaking frame. FIG. 7A shows an initial stereoscopic scene 620 in which the anaglyph has a negative parallax. The cyan left-eye image 622, the outline of which is shown by a dashed line, is to the right of the red right-eye image 624, the outline of which is shown by a solid line. A viewer using red/cyan glasses to view the scene would perceive the FIG. 626 to be in front of the screen of the display. FIG. 7B is a schematic representation 620a of the stereoscopic scene 620 showing the depth of the FIG. 626 represented by the hieroglyphic FIG. 626a in the foreground 576b of the field of view 610 of the viewer. The surface of the display screen 576c is represented be a vertical line.

Figure 8A:
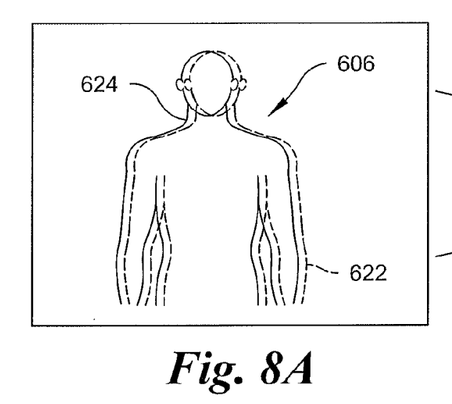
FIGS. 8A and 8B are a digital image of the anaglyph of FIG. 7A after zooming-in on the figure in the scene and a corresponding schematic diagram showing the depth of the figure in the field of view of a user after the zoom.
Figure 8B:
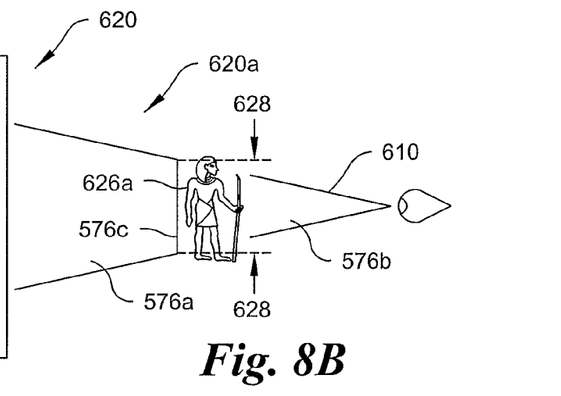

Zooming-in on the FIG. 626 without a parallax adjustment creates a scene in which the FIG. 626 appears enlarged without a change in perceived depth, as shown in FIG. 8A and the corresponding schematic shown in FIG. 8B. Further, as shown by the hieroglyphic 626a in FIG. 8B, the zoom-in has enlarged the FIG. 620 to such an extent that it breaks the frame 628 of the field of view. As the user focuses on the plane 576c of the screen and attempts to accommodate the portion of the figure beyond the frame of the screen, the user's visual system may be stressed as convergence and accommodation are in conflict.

Figure 9A:
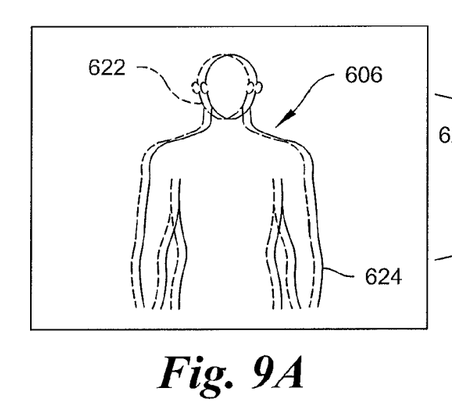
FIGS. 9A and 9B are a digital image of the anaglyph of FIG. 8A after a zoom heuristic has been applied to change the offset of the left-eye image relative to the right-eye image to create a scene with a positive parallax.
Figure 9B:
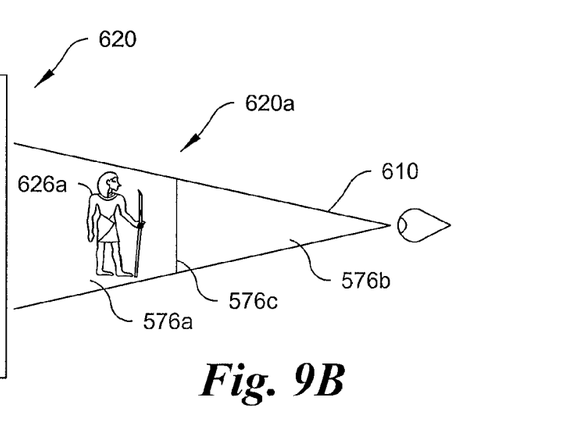

Referring to FIG. 9A and the associated schematic FIG. 9B, when an object to be perceived breaks frame as the result zooming in on a scene, the stress induced by the convergence/ accommodation conflict may be reduced by implementing a zoom heuristic that maintains the size of the FIG. 626 (hieroglyphic 626a) substantially the same as the size of the figure that broke frame in FIGS. 8A-B (i.e., does not reverse the direction of the zoom) and increases the offset between the left-eye image 622 and the right-eye image 644 by an amount sufficient to move the left-eye image to the left of the right-eye image producing a scene having a positive parallax. Consequently, a user viewing the scene in FIG. 9A with red/cyan glasses would perceive that the depth of the figure has moved to the background 576a of the field of view 610.

Referring again to FIGS. 1-3, the stereoscopic image 800 comprises a left-eye image 810 and a right-eye image 812 having relative horizontal disparity. In a displaying step 710 preceding the receiving step 720, the appearance of the stereoscopic image 800 on the display 910 is generated by an electronic processor 914 from stereoscopic image data 814 stored in a memory 912 as a left-eye image pixel map 816 comprising left-eye pixels and a right-eye image pixel map 818 comprising right-eye pixels.

In the scaling step 730 the stereoscopic image data 814 is scaled to produce scaled stereoscopic image data in response to the user zoom request. The requested zoom magnitude is input by the user as a percent. A zoom request for a zoom magnitude less than 100 percent corresponds to a "zooming-out" request and, in response the scaling step 730 decreases the number of pixels comprising the left-eye and right-eye pixel maps 816, 818 thereby reducing the size of the corresponding stereoscopic image. A zoom request greater than 100 percent corresponds to a "zooming-in" request and, in response the scaling step 730 increases the number of pixels comprising the left-eye and right-eye pixel maps 816, 818 thereby increasing the size of the corresponding stereoscopic image 800.

In the adjusting disparity step 740, the horizontal disparity of the scaled stereoscopic image data is adjusted to produce disparity-adjusted, scaled stereoscopic image data based on a heuristic defining a relationship between the user zoom request ($M_z$), a predetermined stereoscopic factor ($F_s$) and a horizontal shift ($S_h$) in the left-eye pixels in the left-eye image pixel map 816 relative to the right-eye pixels in the right-eye image pixel map 818. In some embodiments, the relationship defined by the heuristic may be the following equation:

$$S_h = W_{pxl} \times (M_z/F_s) \quad \text{(Equation 1)}$$

where
- $S_h$ is the horizontal shift in pixels,
- $W_{pxl}$ is the horizontal width of the stereoscopic image in pixels,
- $M_z$ is the zoom magnitude in percent, and
- $F_s$ is the predetermined stereoscopic factor.

The predetermined stereoscopic factor ($F_s$) is determined experimentally and is a metric related to viewer comfort while viewing stereoscopic displays. Human factors analysis of stereoscopic displays has shown that the amount of disparity in stereoscopic images should be limited to be within a defined comfortable range. For all stereoscopic displays, the viewer's eyes must converge to perceive depth a distance from the display plane while still focusing on the display plane. The stress produced by the convergence/accommodation conflict varies from viewer to viewer and is based in part on interpupillary distance, the stereoptic acuity of the viewer, the degree of disparity in the stereoscopic image, the size of the display and the viewing distance from the display.

In some embodiments, the predetermined stereoscopic factor ($F_s$) may be within a desirable range of about 35 to 45. In other embodiments, the predetermined stereoscopic factor ($F_s$) is within a preferable range of about 38 to 41. However, the predetermined stereoscopic factor (F) according to some embodiments of the present invention is not limited to the desirable range of about 35-45 and may be set above or below the desirable range. For a viewer with typical stereoscopic perception viewing a stereoscopic image on a twenty-inch display at a viewing distance of thirty inches, the preferred value for the predetermined stereoscopic factor ($F_s$) has been found to be about 40.

As viewing comfort may vary from viewer to viewer, in some embodiments, the user zoom request may additionally comprise a stereoscopic adjustment factor ($A_s$) and the adjusting step 740 adjusts the predetermined stereoscopic factor ($F_s$) based on the stereoscopic adjustment factor ($A_s$). Preferably, the adjustment is made incrementally through multiple requests, each increasing or decreasing the predetermined stereoscopic factor ($F_s$) by a predetermined value which is preferably plus one unit or minus one unit.

Accordingly, in embodiments in which the user has the ability to adjust predetermined stereoscopic factor ($F_s$), the relationship defined by the heuristic may be the following equation:

$$S_h = W_{pxl} \times (M_z/(F_s + A_s)) \quad \text{(Equation 2)}$$

where $A_s$ is the stereoscopic adjustment factor.

In some embodiments the user zoom request may additionally comprise a position adjustment factor ($A_{pos}$) and the adjusting the horizontal disparity step 740 adjusts a depth of the disparity-adjusted, scaled stereoscopic image data based on the position adjustment factor ($A_{pos}$). As stated above with reference to FIGS. 4A-9B zooming without a parallax adjustment creates a scene in which perceived depth of objects in the scene does not change. By setting the position adjustment factor ($A_{pos}$) to the value positive one (+1), the objects in the scene move forward during a zoom-in or zoom-out. By setting the position adjustment factor ($A_{pos}$) to the value negative one (−1), the objects in the scene moves backward during a zoom-in or zoom-out.

In embodiments where the user zoom request comprises a zoom magnitude ($M_z$), a stereoscopic adjustment factor ($A_s$) and a position adjustment factor ($A_{pos}$), the relationship defined by the heuristic may be the following equation:

$$S_h = A_{pos} \times W_{pxl} \times (M_z/(F_s + A_s)) \quad \text{(Equation 3)}$$

Although the heuristic may be represented by an equation, in a preferred embodiment, the horizontal shift for a disparity adjusted zoom of a stereoscopic image may be expressed as either a percent of image width or as a number of pixels based on a look-up table and interpolation. For example, Table 1 shows the relationship between percent zoom, in increments of 100, and the percent change in disparity for any size image, or alternatively, the pixel shift for a stereoscopic image one-thousand (1000) pixels wide based on empirical data from experiments for maintaining viewing comfort during zooms of various magnitudes.

TABLE 1

| % Zoom | % Disparity Change | Pixel Shift for 1000 pixel wide image |
|---|---|---|
| 100 | 0 | 0 |
| 200 | 2.5 | 2.5 |
| 300 | 5 | 5 |
| 400 | 7.5 | 7.5 |
| 500 | 10 | 10 |
| 600 | 12.5 | 12.5 |
| 700 | 15 | 15 |

TABLE 1-continued

| % Zoom | % Disparity Change | Pixel Shift for 1000 pixel wide image |
|---|---|---|
| 800 | 17.5 | 17.5 |

In the second displaying step 760, a zoomed stereoscopic image corresponding to the disparity-adjusted, scaled stereoscopic image data is generated on the display.

In some embodiments, the zooming method 700 may have a cropping step 750 in which the disparity-adjusted, scaled stereoscopic image data is cropped before the second displaying step 760 to fit the viewable area of the display.

In some embodiments, the stereoscopic device 900, implementing the zooming method 700, has an electronic processor 914 in communication with the display 910 and the electronic memory 912. For illustrative purposes, the stereoscopic device 900 is depicted as a portable handheld multifunction electronic system that may have more or fewer components, may combine two or more components, or may have a different configuration or arrangement of the components than shown in FIG. 2. The various components may be implemented in hardware, software or a combination of both hardware and software.

Devices able to implement the zooming method 700 are not limited to portable handheld devices. The zooming method 700 may also be implemented on interactive devices with large displays capable of displaying stereoscopic images such as floor standing or wall mounted electronic displays (or televisions) which the user may control with a remote control unit in communication with the display electronics.

The stereoscopic device 900 has a zoom-selector user interface 916 in communication with the processor 914. The zoom-selector user interface 916 is configured to receive as input a user zoom request comprising a zoom magnitude. In some embodiments, the zoom-selector user interface 916 may comprise a plurality of button switches 918 on the housing 920 of the stereoscopic device 900. For example, the housing 920 may have a zoom-in button 922 and a zoom-out button 924. The longer the button 922, 924 is depressed, the greater the magnitude of the zoom. Alternatively, the zoom-selector user interface 916 may comprise a slider or toggle switch (not shown) with a neutral mid-position corresponding to zero zoom. Moving the switch to one side of neutral corresponds to zooming-in and to the other side of neutral to zooming-out. The distance for the neutral position (for sliders) or the time away from the neutral position (toggles) determines the magnitude of the zoom. In some embodiments having a touch screen display, the zoom-user interface may be graphically depicted by a plurality of icons on the touch screen display having functionality corresponding to the plurality of physical button switches. In other embodiments, the zoom-selector user interface 916 may be a combination of physical button switches and graphically depicted switches on a touch screen.

In some embodiments of the stereoscopic device 900, the display is not designed to be handheld. In such instances, the zoom-selector user interface 916 may be provided on a remote control unit (not shown) in wireless communication with the electronic processor 914 of the stereoscopic device 900. The remote control may have control electronics in electrical communication with button switches and/or a contact-sensitive display having virtual switches equivalent to the button switches. The control electronics housed in the remote control are configured to determine whether one or more contacts with the contact-sensitive display or the button switch represents a user zoom request and if a user zoom request has been made to transmit the user zoom request to the electronic processor 914 of the stereoscopic device 900.

In some embodiments the user zoom request may also include a stereoscopic adjustment factor ($A_s$) and/or a position adjustment factor ($A_{pos}$) and the plurality of buttons switches 918 of the zoom-user interface 916 may include a stereoscopic adjustment factor button switch 926 and/or a position adjustment factor button switch 928 or touch screen equivalents thereof. Similar to entering the zoom magnitude, the stereoscopic adjustment factor may be entered incrementally by repeatedly toggling the stereoscopic adjustment factor button switch 926 in one direction to increase the value of the predetermined stereoscopic factor ($F_s$) or the other direction to decrease the value of the predetermined stereoscopic factor ($F_s$). The position adjustment switch 928 may be a two position switch inputting a plus one when in a first position and a minus one when in a second position. In some touch screen embodiments, the zoom-user interface 916 may be a drop-down menu of user selectable parameters corresponding to the user zoom request.

The memory 912 of the stereoscopic device 900 may have stored therein stereoscopic image data 814 comprising a left-eye image pixel map 816 comprising left-eye pixels and a right-eye image pixel map 818 comprising right-eye pixels. The left-eye image pixel map 816 has horizontal disparity with respect to the right-eye image pixel map 818. In some embodiments, the stereoscopic image data 814 may be one or more still stereoscopic images or stereoscopic videos having frames that may be frozen for zooming.

The memory 912 of the stereoscopic device 900 has one or more programs 930 stored therein. The programs 930 are configured to be executed by the electronic processor 914. The one or more programs 930 comprise image displaying instructions 932 generating on the display an image corresponding to the stereoscopic image data 814 and stereoscopic image zoom instructions encoding the zooming method 700.

Those skilled in the art will appreciate that changes could be made to the embodiments described above without departing from the broad inventive concept thereof. Therefore, the method and system for adjusting the disparity of a stereoscopic image appearing on an electronic display when a user zoom request is received is not limited to the particular embodiments disclosed, but it is intended to cover modifications within the spirit and scope of the present invention as defined by the appended claims.

This application is related to U.S. patent application Ser. No. 12/948,862 filed Nov. 18, 2010 as a continuation of International Patent Application No. PCT/US2010/048253, filed Sep. 9, 2010, designating the United States and which was published in the English language on Mar. 17, 2011 under International Publication No. WO 2001/031848 A3, which International Patent Application, in turn, claims the benefit of related U.S. Provisional Patent Application No. 61/240,765, filed Sep. 9, 2009. Each of the above-identified related applications is incorporated in the entirety herein by reference.

All references, patent applications, and patents mentioned above are incorporated herein by reference in their entirety and are not to be construed as an admission that any of the cited documents constitutes prior art, or as an admission against interest in any manner.

I claim:

1. A method for zooming a stereoscopic image appearing on an electronic display of a stereoscopic image displaying device in response to receiving a user zoom request comprising a zoom magnitude, the stereoscopic image comprising a left-eye image and a right-eye image having relative horizontal disparity and being generated by a an electronic processor from stereoscopic image data stored in a memory as a left-eye image pixel map comprising left-eye pixels and a right-eye image pixel map comprising right-eye pixels, the method comprising the steps of:

scaling the stereoscopic image data to produce scaled stereoscopic image data in response to the user zoom request;

adjusting the horizontal disparity of the scaled stereoscopic image data to produce disparity-adjusted, scaled stereoscopic image data based on a heuristic defining a relationship between the user zoom request, a predetermined stereoscopic factor $F_s$ within a range of about 35 to 45 and a relative horizontal shift between the left-eye pixels in the left-eye image pixel map and the right-eye pixels in the right-eye image pixel map; and displaying a zoomed stereoscopic image on the display corresponding to the disparity-adjusted, scaled stereoscopic image data.

2. The method of claim 1, wherein the relationship defined by the heuristic is the equation:

$$S_h = W_{psd} \times (M_z/F_s)$$

where $S_h$ is the horizontal shift in pixels,
$W_{psd}$ is the horizontal width of the stereoscopic image in pixels,
$M_z$ is the zoom magnitude in percent, and
$F_s$ is the predetermined stereoscopic factor.

3. The method of claim 1, wherein the user zoom request additionally comprises a stereoscopic adjustment factor and the adjusting the horizontal disparity step adjusts the predetermined stereoscopic factor based on the stereoscopic adjustment factor.

4. The method of claim 1, wherein the user zoom request additionally comprises a position adjustment factor and the adjusting the horizontal disparity step adjusts a depth of the disparity-adjusted, scaled stereoscopic image data based on the position adjustment factor.

5. The method of claim 1 further comprising the step of cropping the disparity-adjusted, scaled stereoscopic image data before the generating step.

6. A method for zooming a stereoscopic image appearing on an electronic display of a stereoscopic image displaying device in response to receiving a user zoom request comprising a zoom magnitude, the stereoscopic image comprising a left-eye image and a right-eye image having relative horizontal disparity and being generated by a an electronic processor from stereoscopic image data stored in a memory as a left-eye image pixel map comprising left-eye pixels and a right-eye image pixel map comprising right-eye pixels, the method comprising the steps of:

scaling the stereoscopic image data to produce scaled stereoscopic image data in response to the user zoom request;

adjusting the horizontal disparity of the scaled stereoscopic image data to produce disparity-adjusted, scaled stereoscopic image data based on a heuristic defining a relationship between the user zoom request, a predetermined stereoscopic factor and a relative horizontal shift between the left-eye pixels in the left-eye image pixel map and the right-eye pixels in the right-eye image pixel map; and displaying a zoomed stereoscopic image on the display corresponding to the disparity-adjusted, scaled stereoscopic image data, wherein the user zoom request additionally comprises a stereoscopic adjustment factor and a position adjustment factor and the adjusting the horizontal disparity step adjusts the predetermined stereoscopic factor based on the stereoscopic adjustment factor and adjusts a depth of the disparity-adjusted, scaled stereoscopic image data based on the position adjustment factor, and wherein the relationship defined by the heuristic is an equation:

$$S_h = A_{pos} \times W_{pxl} \times (M_z/(F_s + A_s))$$

where $S_h$ is the horizontal shift in pixels,
$A_{pos}$ is the position adjustment factor
$W_{pxl}$ is the horizontal width of the stereoscopic image in pixels,
$M_z$ is the zoom magnitude in percent,
$F_s$ is the predetermined stereoscopic factor, and
$A_s$ is the stereoscopic adjustment factor.

7. A stereoscopic image generating device comprising:
an electronic display;
electronic memory;
an electronic processor in communication with the display and the electronic memory;
a zoom-selector user interface in communication with the processor, the zoom-selector user interface configured to receive as input a user zoom request comprising a zoom magnitude;
stereoscopic image data stored in the memory, the stereoscopic image data comprising a left-eye image pixel map comprising left-eye pixels and a right-eye image pixel map comprising right-eye pixels, the left-eye image pixel map having horizontal disparity with respect to the right-eye image pixel map, and
one or more programs stored in the memory and configured to be executed by the electronic processor, the one or more programs comprising:
image generation instructions generating on the display an image corresponding to the stereoscopic image data; and
stereoscopic image zoom instructions encoding the method of claim 6.

8. The stereoscopic image generating device of claim 7, wherein the zoom-selector user interface is provided by a remote control unit in wireless communication with the electronic processor, the remote control having control electronics in electrical communication with a button switch and a contact-sensitive display, the control electronics configured to determining whether one or more contacts with the contact-sensitive display or the button switch represents a user zoom request and if a user zoom request has been made transmitting the user zoom request to the electronic processor.

* * * * *